UNITED STATES PATENT OFFICE.

WALTER S. ROCKEY AND HILLIARY ELDRIDGE, OF NEW YORK, N. Y.

FLUX FOR BRASS PLATING.

971,563.   Specification of Letters Patent.   Patented Oct. 4, 1910.

No Drawing.   Application filed November 26, 1909.  Serial No. 529,872.

*To all whom it may concern:*

Be it known that we, WALTER S. ROCKEY and HILLIARY ELDRIDGE, citizens of the United States, residing at New York city, in the county of New York and State of New York, have invented certain new and useful Improvements in Flux for Brass Plating, of which the following is a full, clear, and exact specification.

Our invention relates to a process for making a protecting flux, for use in plating single articles of iron, cast iron, malleable iron, or steel, with brass.

Provide an iron pot silver plated on the inside for the purpose of boiling the water out of the boracic acid; the reason for silver plating the iron pot on the inside is to prevent any oxidation of the iron of the pot by the water that is in the boracic acid. The oxygen of the water, at a red heat, combining with the iron of the pot, forms iron oxid which is detrimental to good brass plating. Silver at a red heat does not decompose water, and for this reason we silver plate the iron pot on the inside. Boil the boracic acid in this pot at a low red heat until all steam ceases to pass off; then transfer the boracic acid from the iron pot into an aluminum oxid, magnesite or magnesium oxid crucible, or a crucible that is used for melting glass in glass works, are good for melting boracic acid. After the boracic acid is transferred to the crucible as designated the crucible is then heated to a white heat until the molten boracic acid becomes placid and shows no ebullition of bubbles. Then reduce the temperature to a bright red heat. Then a sufficient quantity of metallic zinc is added to the boracic acid to decompose the constitutional water that is still remaining in the boracic acid. After the zinc is added, cover the crucible with a loose cover and keep the cover on until the reaction is over; the cessation of the reaction is denoted by the green flames ceasing to pass out from under the edges of the cover. When they cease, remove and stir the mass with a clay rod until all bubbles are eliminated. The reaction being over there now remains in the crucible a mixture of boron trioxid and zinc oxid. The hydrogen of the water being released and gaseous, passed off from under the cover during the reaction and being ignited by the furnace fire, presented the appearance of green flames on account of the hydrogen being impregnated with boron trioxid or its impurities which changed the hydrogen blue color to a green. The constitutional water of the boracic acid thus being eliminated by the reaction as described, the boracic acid becomes boron trioxid. The flux now being ready for use can be preserved for future use by pouring it out of the crucible while still molten into clean iron receptacles which are provided with air tight covers which prevent the flux from absorbing moisture from the atmosphere when the receptacles are closed by them. But, however, should it be desired to use the flux at once for plating, or plating and welding, then put into the crucible while it is still in the furnace and the flux is still molten the brass with which it is desired to plate. Care must be taken when the brass is put into the crucible to see that it is well covered by the flux, for if any of the brass should protrude above the surface of the flux it will oxidize. The temperature should then be regulated to just above the fusing point of the brass which is being melted and kept at that temperature until the brass has become thoroughly fused and liquid. Then immerse a chemically cleaned piece of sheet iron or other iron into the molten brass through the covering of flux and then withdraw it. After withdrawal, the iron article will be found to be covered with two separate and distinct stratas or coverings, one a plating or coating of brass on the iron which adheres to and has become an integral part of the iron and the other a coating or covering of the flux over the brass which protected the brass from becoming oxidized when withdrawn from the bath. This covering of flux is detachable and is removed from the brass plated iron after cooling and is remelted and again treated as already described before using again to eliminate all moisture that might have been absorbed while in a cool state.

Having thus described our invention, what we claim as new and desire to secure by Letters Patent is:

1. The process of making a protecting flux for brass consisting in reducing boracic acid to a fluid condition by heat and then adding metallic zinc to decompose the remaining water.

2. The process of making a protecting flux for brass consisting in first placing boracic acid in a silver lined pot and reducing same to a fluid condition by heat, then transferring said boracic acid to a suitable crucible and heating said acid until it becomes placid, then adding metallic zinc sufficient to decompose the remaining constitutional water.

3. The process of making a flux which consists in first boiling boracic acid in an iron pot at a low temperature until it ceases to emit steam, then transferring same to a suitable crucible and heating at a white heat until it becomes placid, then reducing the temperature to a bright red heat, then adding a sufficient quantity of metallic zinc to decompose the remaining water.

4. The process of making a flux which consists in first boiling boracic acid in an iron pot at a low temperature until it ceases to emit steam, then transferring same to a suitable crucible and heating at a white heat until it becomes placid, then reducing the temperature to a bright red heat, and then adding metallic zinc in sufficient quantities to decompose the remaining water.

5. The process of making a flux for plating brass which consists in boiling boracic acid in an iron pot at a low temperature until all steam ceases to come off, then transferring same into a suitable crucible and heating at a white heat until it becomes placid, then reducing the temperature to a bright red heat, then adding a sufficient quantity of zinc in a divided state to decompose the remaining water of the constitution and stirring the fluid until all reaction ceases.

6. The process of making a protecting flux for brass consisting in first placing boracic acid in a suitable pot and reducing same to a fluid condition by heat, then transferring said boracic acid to a suitable crucible and heating said acid until it becomes placid, then adding metallic zinc sufficient to decompose the remaining constitutional water.

In testimony whereof, we affix our signatures, in presence of two witnesses.

WALTER S. ROCKEY.
HILLIARY ELDRIDGE.

Witnesses:
JOSEPH MATTES,
JOHN MULLIGAN.